(12) United States Patent
Park

(10) Patent No.: US 6,546,415 B1
(45) Date of Patent: Apr. 8, 2003

(54) NETWORK MANAGEMENT SYSTEM USING A DISTRIBUTED NAMESPACE

(75) Inventor: Joonho Park, Fort Lee, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/312,524

(22) Filed: May 14, 1999

(51) Int. Cl.[7] .............................................. G06F 15/16
(52) U.S. Cl. ....................................... 709/202; 709/223
(58) Field of Search ............................... 709/203, 202, 709/223

(56) References Cited

U.S. PATENT DOCUMENTS

| | | | |
|---|---|---|---|
| 5,465,365 A | | 11/1995 | Winterbottom |
| 5,623,666 A | | 4/1997 | Pike et al. |
| 5,724,512 A | | 3/1998 | Winterbottom |
| 5,742,762 A | * | 4/1998 | Scholl et al. ............... 709/200 |
| 5,822,569 A | * | 10/1998 | McPartlan et al. ............ 703/21 |
| 6,008,805 A | * | 12/1999 | Land et al. .................. 345/744 |
| 6,145,001 A | * | 11/2000 | Scholl et al. ............... 709/200 |
| 6,182,157 B1 | * | 1/2001 | Schlener et al. ............ 709/202 |
| 6,269,398 B1 | * | 7/2001 | Leong et al. .................. 703/21 |
| 6,272,537 B1 | * | 8/2001 | Kekic et al. ................. 709/203 |

OTHER PUBLICATIONS

M. Rose, "SNMP MUX Protocol and MIB", Request for Comments No. 1227 (May 1991), available from http://www.cis.ohio-state.edu/htbin/rfc/rfc1227.html.

B. Wijnen et al., "Simple Network Management Protocol Distributed Protocol Interface Version 2.0", Request for Comments No. 1592 (Mar. 1994), available from http://www.cis.ohio-state.edu/htbin/rfc/rfc1157.html.

* cited by examiner

Primary Examiner—Kenneth R. Coulter
Assistant Examiner—Hai Nguyen
(74) Attorney, Agent, or Firm—Ryan, Mason & Lewis, LLP

(57) ABSTRACT

A method and apparatus are disclosed for remotely managing network elements in a distributed computing system. The distributed computing system utilizes a software entity, such as an operating system, to manage the location of, and communication with, distributed resources in the distributed computing system. A network manager and/or SNMP agents can interact with distributed elements to obtain desired management information independent of the location of the distributed elements. Thus, master agents can communicate with managed network nodes without adhering to the intricate requirements of the SMUX or DPI protocols. SNMP MIBs are implemented as hierarchical file systems, comprised of a tree of file-like objects, that may be accessed through a namespace. The SNMP MIB namespace allows the network manager, master agent and SNMP agents to access each resource, including SNMP MIBs, in a uniform, file-oriented manner. The SNMP MIB namespace of each network node managed by a master agent can be mounted into the namespace of the master agent to create a distributed MIB namespace. The MIB of each managed node is mounted to the MIB namespace of the master agent and appropriate connections through the distributed network are established by the operating system or another software entity.

20 Claims, 4 Drawing Sheets

NETWORK MANAGEMENT SYSTEM USING A DISTRIBUTED NAMESPACE

FIELD OF THE INVENTION

The present invention relates to a distributed computing system, and more particularly to the remote management of network elements in distributed computing systems.

BACKGROUND OF THE INVENTION

The resources and computation tasks in a computing system are frequently spread among a plurality of network nodes to form a distributed computing system. When centralized resources are shared by a plurality of users in a distributed system, their costs are distributed over a larger user base. In addition, the centralization of shared resources makes the administration and maintenance of these resources more efficient and also potentially more reliable due to the possibility of a centralized backup mechanism. Furthermore, the redundancy provided by most distributed computing environments improves the ability to recover from a failure by allowing processing tasks to continue on an alternate device upon a detected failure.

While the centralization of shared resources potentially makes the administration and maintenance of network elements more efficient and reliable, the increasing diversity of network elements in distributed computing systems provides additional challenges for network management systems that attempt to manage network resources in a uniform manner. Generally, a network management system monitors network activity, allocates network resources, detects and reports faults, and reconfigures the network topology. In order to control the diverse devices of different manufacturers using a uniform set of commands and data format, a standard network management protocol, referred to as the Simple Network Management Protocol ("SNMP"), has been developed. For a discussion of the Simple Network Management Protocol, see, for example, Simple Network Management Protocol, Request for Comments No. 1157 (May 1990), available from http://www.cis.ohio-state.edu/htbin/rfc/rfc1157.html.

The SNMP protocol allows network managers to address queries and commands to diverse network elements in a uniform manner. Generally, the SNMP protocol accomplishes network management tasks by using one or more network managers and at least one agent associated with each managed network element. In accordance with the SNMP protocol, an "agent" is a component associated with each managed network element, such as a server, host, or network gateway. Each agent stores management data in a managed information base ("MIB") and responds to queries from the network manager in accordance with the SNMP protocol for such management data. The MIB is a structured set of data variables, often referred to as objects, in which each variable represents a resource to be managed. The MIB contains information on the entities managed by the agent, such as the number of packets transferred and error information.

The SNMP protocol specifies a number of commands for communicating management information between the network manager and the agents. For example, the SNMP protocol specifies GetRequest, GetNextRequest, SetRequest, GetResponse and Trap commands. In response to a GetRequest or a GetNextRequest command, an agent will evaluate and retrieve the appropriate management data from the MIB. The agents thereafter return the requested management data with a GetResponse command. A SetRequest command is used by the network manager to instruct one or more agents to specify a value in the MIB. Finally, a Trap command is sent by an agent to the network manager to alert the network manager of the occurrence of a predefined condition.

In order to perform the required network management functions, the network manager must use the SNMP commands to obtain management data regarding the network itself, as well as the elements in the network. FIG. 1 illustrates a conventional master-agent environment, where a master SNMP agent 130 communicates management information to a network manager 120 on behalf of a number of network nodes. The distributed network environment 100 of FIG. 1 includes a number of network nodes 110–112, 160–162 and a network manager 120 interconnected by a network 105, such as a local area network (LAN) or a wide area network (WAN). The network nodes 110–112 may be embodied, for example, as workstations, servers and routers. As shown in FIG. 1, a master SNMP agent 130 residing on network node 110 communicates management information to the network manager 120 on behalf of the node 110, as well as a number of additional managed nodes 160–162 that are managed by the master agent 130. Each managed node 160–162 has an associated SNMP sub-agent 170–172, discussed below. In one illustrative implementation, the network node 110 where the master agent 130 resides can be embodied, for example, as a workstation, and the managed network nodes 160–162 may be embodied, for example, as a facsimile machine, printer or server. In addition, the network manager 120 may communicate directly with SNMP agents 150–151 associated with additional nodes 111–112, respectively, of the network.

Thus, to obtain information regarding the managed nodes 160–162, the network manager 120 communicates only with the master agent 130. The master agent 130, in turn, relays requests for management data to the managed nodes 160–162, collects the requested management data from the MIBs of each managed network node 160–162 and communicates the collected management data to the network manager 120. Thus, the master-agent environment is said to implement a distributed MIB.

Communications between the master agent 130 and the SNMP sub-agents 170–172 associated with each managed network node 160–162 must conform to at least two SNMP protocols. First, the Simple Network Management Protocol Multiplexing ("SMUX") protocol, often referred to as the "SMUX protocol," specifies how each SNMP sub-agent 170–172 must register and deregister with the master SNMP agent 130. The SMUX protocol is described, for example, in Request for Comments No. 1227 (May 1991), available from http://www.cis.ohio-state.edu/htbin/rfc/rfc1227.html. Second, the Simple Network Management Protocol Distributed Programming Interface ("DPI") protocol, often referred to as the "SNMP DPI protocol," specifies how SNMP sub-agents 170–172 communicate with the master agent 130. The SNMP DPI protocol is described, for example, in Request for Comments No. 1592 (March 1994), available from http://www.cis.ohio-state.edu/htbin/rfc/rfc1157.html.

While the master agent configuration has further streamlined the network management process, by allowing the network manager 120 to communicate with fewer entities to obtain necessary network management data, the attendant requirements of the SMUX and SNMP DPI protocols have increased the complexity of network management systems that support a distributed MIB. As apparent from the above-described deficiencies with network management systems that utilize a distributed MIB, a need exists for a network management system that does not require compliance with the SMUX and SNMP DPI protocols. In addition, a further need exists for a network management system that provides uninterrupted SNMP agent service while dynamically modifying the distributed MIB. Finally, a need exists for a network management system that significantly reduces the memory requirements associated with conventional network management systems.

SUMMARY OF THE INVENTION

Generally, a method and apparatus are disclosed for remotely managing network elements in a distributed computing system. The disclosed network management system includes one or more network managers, at least one agent associated with each managed network element and a master agent. The master agent communicates management information to the network manager on behalf of the node on which it resides, as well as a number of additional managed nodes. According to one aspect of the invention, the distributed computing system utilizes a software entity, such as an operating system, to manage the location of, and communication with, distributed resources in the distributed computing system. In this manner, the network manager and SNMP agents can interact with distributed elements to obtain desired management information independent of the location of the distributed elements.

According to another aspect of the invention, SNMP MIBs in the distributed computing environment are implemented as hierarchical file systems, comprised of a tree of file-like objects, that may be accessed through a namespace. The SNMP MIB namespace of the present invention allows the network manager and master agent to access each resource, including SNMP MIBs, in a uniform, file-oriented manner. The hierarchical SNMP MIB namespace provides a mechanism for maintaining the relationship between names and entities, and permits the network manager and master agent to locate desired information by means of a pathname.

The SNMP MIB namespace of each network node managed by the master agent can be mounted into the namespace of the master agent to create a distributed MIB namespace. Thus, the master agent can obtain information from the distributed MIB namespace regarding the managed network nodes without regard to the location of the managed network nodes. The MIBs of each managed node is mounted to the MIB namespace of the master agent and appropriate connections through the distributed network are established by the operating system or another software entity.

The present invention is operative in a master-agent environment, where a master SNMP agent communicates management information to a network manager on behalf of a number of managed network nodes, each having an associated SNMP sub-agent. When the master agent receives a request from the network manager for management data regarding a managed network node, the master agent extracts the object identifier of the MIB from the request and maps the object identifier to a corresponding file in the MIB namespace. Thereafter, the master agent can open the file and write the received request to the file, thereby activating a process associated with the file. The activated process reads and executes the request and writes the result to the file. The master agent then transmits the result to the network manager.

A more complete understanding of the present invention, as well as further features and advantages of the present invention, will be obtained by reference to the following detailed description and drawings.

DETAILED DESCRIPTION

Figure 1:
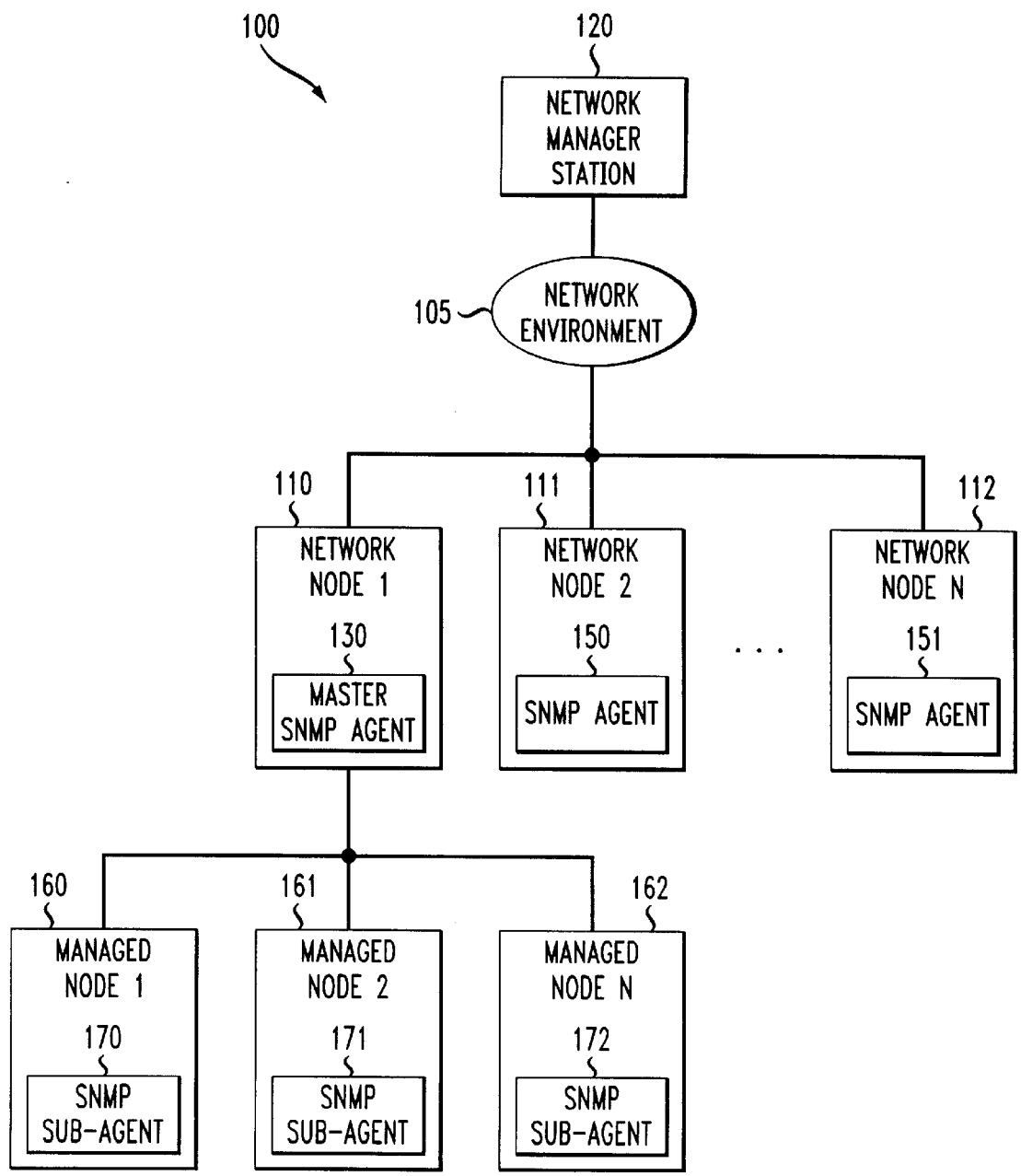
FIG. 1 illustrates a conventional master-agent environment, where a master SNMP agent communicates management information to a network manager on behalf of a number of network nodes.

The present invention improves on conventional management systems for distributed computing environments 100 by allowing the master agent 130 to communicate with the managed network nodes 160–162 without adhering to the intricate requirements of the SMUX or DPI protocols. The present invention permits the master agent 130 to collect management data from the MIBs of each managed network node 160–162 without regard to the distributed nature or location of such MIBs.

According to one feature of the present invention, the distributed computing environment 100 utilizes a software entity, such as an operating system or another software entity, discussed below, to manage the location of distributed resource. In this manner, the network manager 130 and master SNMP agent 130 can interact with distributed elements, such as the managed network nodes 160–162, without regard to their location. In one illustrative implementation, the distributed computing environment 100 utilizes the Inferno™ operating system, commercially available from Lucent Technologies Inc., of Murray Hill, N.J., to manage the location of distributed resources. For a detailed discussion of the Inferno™ operating system, see, for example, the Inferno™ Reference Manual (1997), available from Lucent Technologies Inc., or U.S. Pat. Nos. 5,465,365; 5,623,666 or 5,724,512, each commonly assigned to the assignee of the present invention and incorporated by reference herein.

Generally, the illustrative Inferno™ operating system represents resources, such as storage devices, processes, services, networks, and network connections, as files, and utilizes a namespace to represent and access such resources. In this manner, the interface to each resource is file-oriented, and involves resolving names in a hierarchical tree, attaching to files by names, and accessing file contents using read and write commands. An application builds a private view of the resources and services to be accessed using a computable namespace. Each set of resources and services is represented as a hierarchy of files and is accessible using familiar file access operations (open, read, write). The collection of resources and services being used by a process are combined into a single rooted hierarchy of file names, referred to as a namespace. The resources accessible to an individual namespace can be located on a single local node, or on multiple nodes distributed throughout the network. Thus, file systems provided by different servers can be combined into a single, unique namespace that becomes the application's view of the distributed environment.

The illustrative Inferno™ operating system allows the network manager 130 and the master agent 130 to access local or remote MIBs in the same manner. As previously indicated, management data for each node is stored in a MIB. According to another feature of the present invention, each SNMP MIB in the distributed computing environment 100 is implemented as a hierarchical "file" system, comprised of a tree of file-like objects, that may be accessed through a namespace. In this manner, the network manager 130, the master agent 130 and the SNMP agents 150, 151 can access each resource, including SNMP MIBs, in a uniform, file-oriented manner. For a general discussion of name spaces in distributed computing environments, see Roger M. Needham, Names, in Distributed Systems 315–27 (Sape Mullender ed., 2d ed. 1993).

Figure 2:
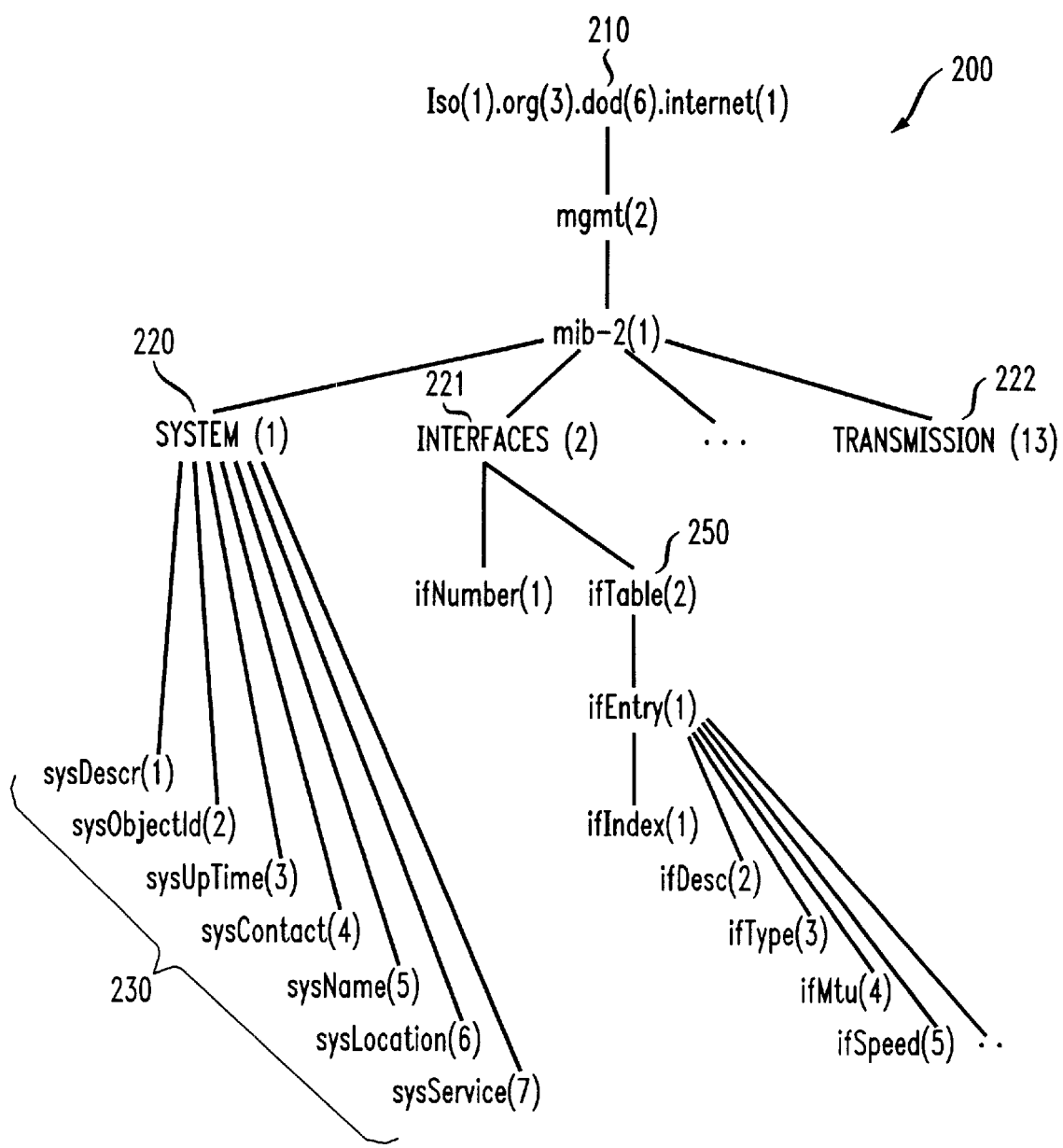
FIG. 2 illustrates a file system representation of an SNMP MIB for a network node.

FIG. 2 illustrates a file system representation 200 of an SNMP MIB corresponding to a network node 110–112, 160–162, in accordance with the MIB-II specification. For a detailed discussion of the MIB-II specification, see, for example, Management Information Base for Network Management of TCP/IP-Based Internets: MIB-II, Request for Comments No. 1213, available from http://www.cis.ohio-state.edu/htbin/rfc/rfc1213.html (May, 1990), incorporated by reference herein. Generally, the SNMP MIB is organized according to an object identifier-naming tree. The naming tree 200 is comprised of a root directory 210, as well as a number of leaf nodes, such as the set of leaf nodes 230, and interior nodes, such as the interior nodes 220–222. Leaf nodes define values for management data, and the interior nodes organize the leaf nodes, in a similar manner to directories in a file system, so that related nodes can be grouped together. Thus, an SNMP MIB can be represented as a file system 200 using a one-to-one mapping of leaf nodes to files and interior nodes to directories.

The hierarchical SNMP MIB namespace 200 shown in FIG. 2 provides a mechanism for maintaining the relationship between names and entities, and permits the network manager 130, master SNMP agent 130 or SNMP agents 150–151 to locate desired information by means of a pathname. A pathname of a file is an alphanumeric string identifying a file by specifying a path through the hierarchical structure 200 to the file. In one embodiment, a pathname consists of the "/" character, representing the root directory, together with the names of all of the directories between the root directory and the desired file, each separated by the slash character.

As discussed further below, the SNMP MIB namespace 200 of each managed network node 160–162 can be mounted into the namespace of the master SNMP agent 130 to create a distributed MID. Thus, the master SNMP agent 130 can obtain information regarding the managed network nodes 160–162 without regard to the location of the managed network nodes 160–162. In one implementation, the interior node 250 (FIG. 2) serves as a mount point for the MIBs of each managed node 160–162. Thus, the MIB of each managed node 160–162 becomes a row in the ifTable 250, in a known manner.

In order to join the MIBs of each managed node 160–162 to the MIB namespace 200 of the network manager 130, the appropriate connections through the network 100 must be established. The mechanisms for establishing the network connections and for joining the name space of a particular remote managed nodes 160–162 to the desired location of the name space 200 associated with the 130 are provided by the Inferno™ operating system and are described, for example, in U.S. Pat. No. 5,724,512, incorporated by reference above.

It is noted that the mount command makes a name already in the current local name space 200, referred to herein as the "from" file, equivalent to the root of another file system, such as a remote managed node 160–162, referred to herein as the "to" file, represented as another channel. In other words, the mount command mounts the channel representing the root directory of another file system 160–162 upon a channel representing an indicated portion of the current name space 200. Thus, following execution of a mount command, references to the file specified by the "from" pathname, which has been mounted upon, and any files below it in the hierarchy 200, will be interpreted as references to the files in the file tree of the MIB of the appropriate managed node 160–162 and thus become request messages written to the communication stream.

As discussed further below in conjunction with FIG. 4, when the master agent 130 receives a request from the network manager 120 for management data regarding one of the managed network nodes 160–162, the master agent 130 extracts the object identifier of the MIB from the request and maps the object identifier to a corresponding file in the MIB namespace 200. Thereafter, the master agent 130 opens the file and writes the request received from the network manager 120 to the file, thereby activating a process associated with the file. The activated process reads and executes the request and writes the result to the file. The master agent 130 then transmits the result to the network manager 120.

Figure 3:
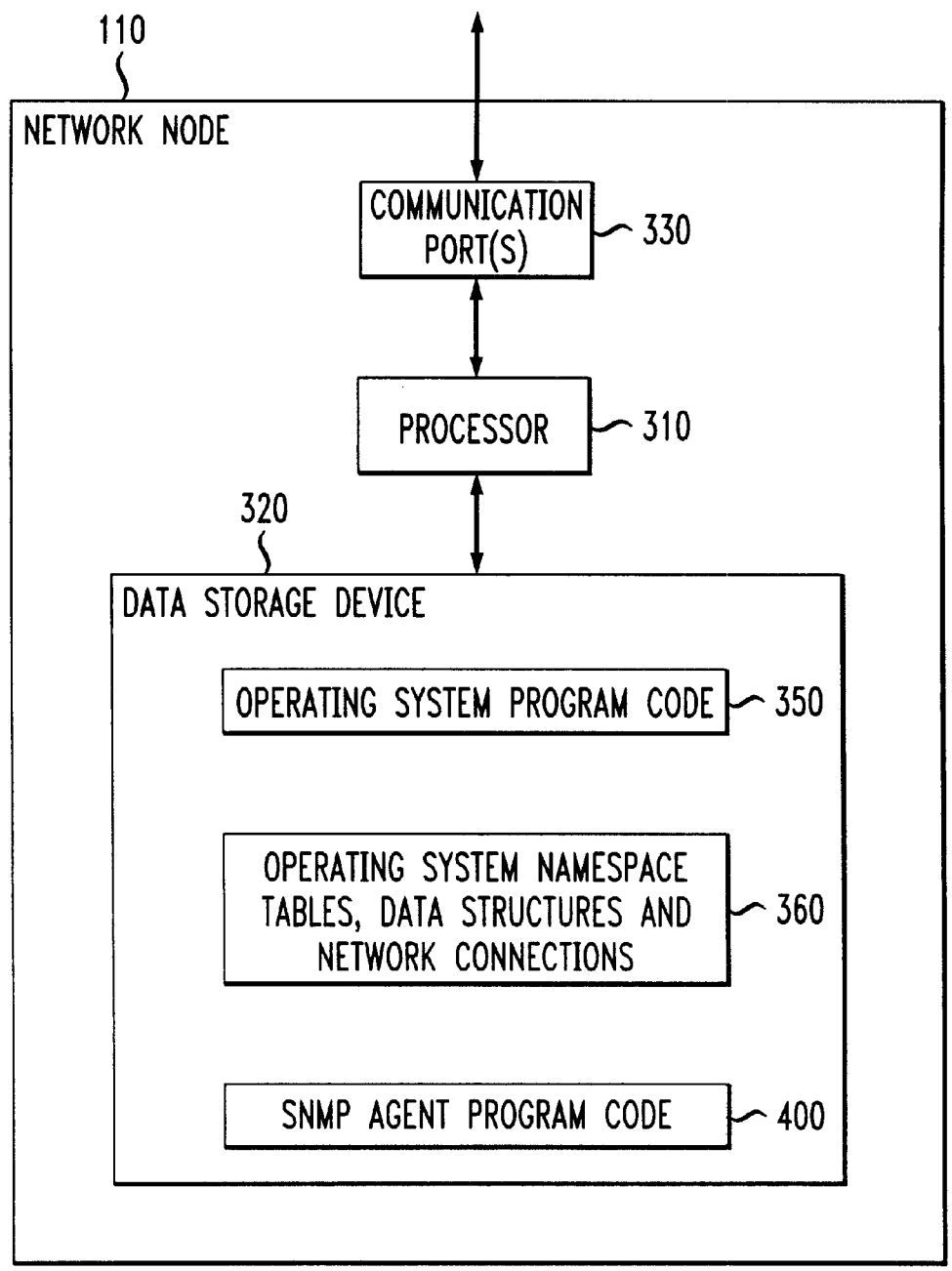
FIG. 3 is a block diagram illustrating a network node in accordance with the present invention, where a master agent resides.

FIG. 3 is a block diagram showing the architecture of an illustrative network node 110, where a master agent 130 resides. As indicated above, the network node 110 may be embodied, for example, as a workstation, server or router, as modified herein to execute the functions and operations of the present invention. The network node 110 includes a processor 310 and related memory, such as a data storage device 320. The processor 310 may be embodied as a single processor, or a number of processors operating in parallel. The data storage device 320 and/or a read only memory (ROM) are operable to store one or more instructions, which the processor 310 is operable to retrieve, interpret and execute.

As discussed above, the data storage device 320 includes operating system program code 350, such as the illustrative Inferno™ operating system discussed above. In addition, the data storage device 320 includes the tables, data structures and network connections 360 necessary for the operating system to manage the location of and communication with the distributed managed nodes 160–162. For a discussion of the tables, data structures and network connections that are created or modified to implement the management of, and communication with, distributed resources, see, for example, U.S. Pat. No. 5,724,512, incorporated by reference above. The data storage device 320 also includes SNMP agent program code 400, discussed below in conjunction with FIG. 4. Generally, the SNMP agent program code 400 processes requests from the network manager 120 for management data associated with the managed nodes 160–162.

The communications port 330 connects the network node 110 to the network environment 105, thereby linking the network node 110 to each connected node, such as the nodes 111–112, 160–162, as well as the network manager 120.

Figure 4:
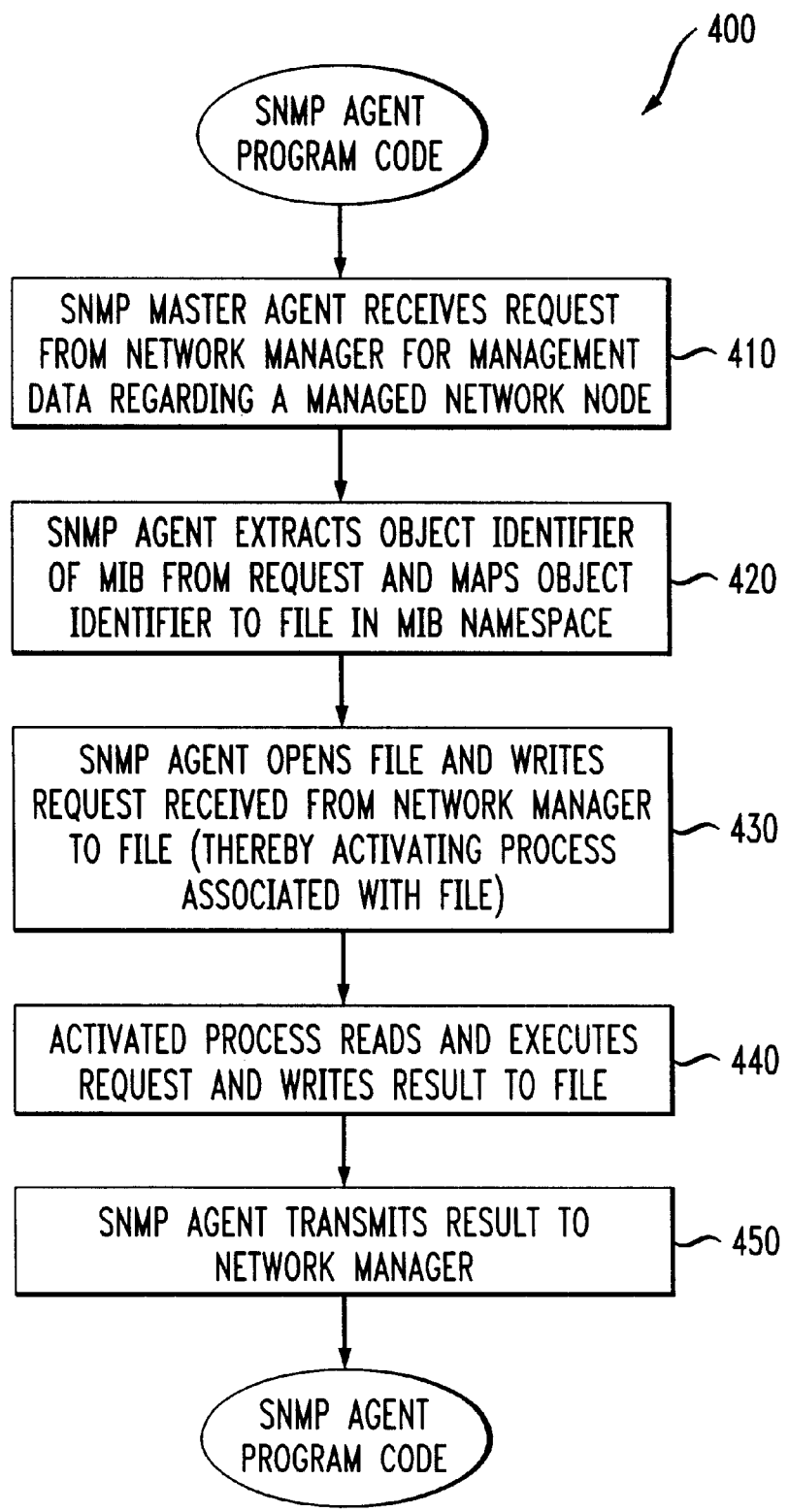
FIG. 4 is a flow chart describing an exemplary SNMP agent program implemented by the network node of FIG. 3.

As previously indicated, the SNMP agent program code 400, shown in FIG. 4, processes requests from the network manager 120 for management data associated with the managed nodes 160–162. Initially, the master agent 130 receives a request from the network manager 120 for management data regarding one of the managed network nodes 160–162 during step 410. Thereafter, the master agent 130 extracts the object identifier of the MIB from the request and maps the object identifier to a corresponding file in the MIB namespace 200 during step 420. For example, if the request is of the form "1.3.6.1.2.1.1.1.0," then the mapping consists of filename~mib/1/3/6/1/2/1/1/1.

During step 430, the master agent 130 opens the file and writes the request received from the network manager 120 to the file, thereby activating a process associated with the file. The activated process reads and executes the request and writes the result to the file during step 440. Finally, the master agent 130 then transmits the result to the network manager 120 during step 450, before program control terminates during step 460.

The present invention allows the MIB code of the SNMP agent program code 400 to be modified, for example, to update the software code to fix bugs, in a non-disruptive way. Since many independent processes provide the MIB value, only affected processes have to be recompiled, which does not stop the service of the SNMP agents. For conventional network management systems, the agent and MIB code belong to the same module, which then have to be recompiled altogether to accommodate any code change. Thus, the agent must temporarily suspend operation.

As previously indicated, the distributed computing environment 100 utilizes a software entity, such as an operating system or another software entity, discussed below, that manages the location of distributed resources. In the illustrative implementation, the distributed computing environment 100 utilizes the Inferno™ operating system to manage the location of distributed resources. In alternate embodiments, any operating system or other software entity that manages the location of and communication with distributed devices, such as CORBA and JAVA RMI, or other technologies with remote procedure call (RPC) capabilities, can support a distributed MIB similar to the namespace provided by the Inferno™ operating system. For a discussion of the Corba Language, see, for example, Corba v2.1 Specification (Object Management Group August, 1997), incorporated by reference herein. For a discussion of JAVA RMI, see, for example, Java Remote Method Invocation, Sun Microsystems (1997), incorporated by reference herein.

It is to be understood that the embodiments and variations shown and described herein are merely illustrative of the principles of this invention and that various modifications may be implemented by those skilled in the art without departing from the scope and spirit of the invention.

I claim:

1. A method performed by an SNMP agent for remotely managing network elements in a distributed computing system, comprising the steps of:
    establishing a namespace that includes a managed information base (MIB) for each of said network elements, said MIBs including management data for said corresponding network element;
    receiving a request from an entity for information about one of said network elements stored in said MIB;
    obtaining said information about one of said network elements from said namespace; and
    providing said obtained information about one of said network elements to said entity.

2. The method according to claim 1, wherein said obtaining step further comprises the steps of opening a file in said namespace, writing said request to said file and reading a result from said file.

3. The method of claim 1, wherein said establishing step further comprises the steps of mounting the MIB of each network element into the namespace of a network manager.

4. The method of claim 1, wherein said establishing step further comprises the steps of mounting the MIB of each network element into the namespace of an agent of a network manager.

5. A method for remotely managing network elements in a distributed computing system, said network elements having a managed information base (MIB) that includes management data about said corresponding network elements, said method comprising the steps of:
    maintaining said MIBs in a hierarchical file system that may be accessed through a namespace;
    utilizing a software entity to manage the location of said remote network elements, wherein a file in said namespace can be read independent of the location of said network elements; and
    obtaining information stored in one of said MIBs from said namespace.

6. The method of claim 5, wherein said software entity is an operating system that provides a distributed namespace.

7. The method of claim 5, wherein said software entity is a software entity that provides remote procedure call (RPC) capabilities.

8. The method according to claim 5, wherein said obtaining step further comprises the steps of opening a file in said namespace, writing said request to said file and reading a result from said file.

9. The method of claim 5, wherein said maintaining step further comprises the steps of mounting the MIB of each network element into the namespace of a network manager.

10. The method of claim 5, wherein said maintaining step further comprises the steps of mounting the MIB of each network element into the namespace of an agent of the network manager.

11. A system employed by an SNMP agent for remotely managing network elements in a distributed computing system, comprising:
    a memory for storing computer-readable code; and
    a processor operatively coupled to said memory, said processor configured to execute said computer-readable code, said computer-readable code configuring said processor to:
    establish a namespace that includes a managed information base (MIB) for each of said network elements, said MIB including management data for said corresponding network element;
    receive a request from an entity for information about one of said network elements stored in said MIB;
    obtain said information about one of said network elements from said namespace; and
    provide said obtained information about one of said network elements to said entity.

12. The system according to claim 11, wherein said processor is further configured to open a file in said namespace, write said request to said file and read a result from said file.

13. The system of claim 11, wherein said processor is further configured to mount the MIB of each network element into the namespace of a network manager.

14. The system of claim 11, wherein said processor is further configured to mount the MIB of each network element into the namespace of an agent of a network manager.

15. A system for remotely managing network elements in a distributed computing system, said network elements having a managed information base (MIB) that includes management data about said corresponding network elements, said system comprising:
    a memory for storing computer-readable code; and a processor operatively coupled to said memory, said processor configured to execute said computer-readable code, said computer-readable code configuring said processor to:
maintain said MIBs in a hierarchical file system that may be accessed through a namespace;
utilize a software entity to manage the location of said remote network elements, wherein a file in said namespace can be read independent of the location of said network elements; and
obtain information stored in one of said MIBs from said namespace.

16. The system of claim 15, wherein said software entity is an operating system that provides a distributed namespace.

17. The system of claim 15, wherein said software entity is a software entity that provides remote procedure call (RPC) capabilities.

18. The system according to claim 15, wherein said processor is further configured to open a file in said namespace, write said request to said file and read a result from said file.

19. The system of claim 15, wherein said processor is further configured to mount the MIB of each network element into the namespace of a network manager.

20. The system of claim 15, wherein said processor is further configured to mount the MIB of each network element into the namespace of an agent of the network manager.

* * * * *